United States Patent
Verschoor et al.

(10) Patent No.: US 11,930,101 B2
(45) Date of Patent: Mar. 12, 2024

(54) SYSTEM AND METHOD FOR MITIGATING KEY-EXHAUSTION IN A KEY DISTRIBUTION PROTOCOL

(71) Applicant: evolutionQ, Kitchener (CA)

(72) Inventors: Sebastian Reynaldo Verschoor, Kitchener (CA); Michele Mosca, Waterloo (CA); Thomas Parry, Cambridge (CA); James Godfrey, Waterloo (CA)

(73) Assignee: evolutionQ Inc., Waterloo, CA (US)

( * ) Notice: Subject to any disclaimer, the term of this patent is extended or adjusted under 35 U.S.C. 154(b) by 393 days.

(21) Appl. No.: 17/301,115

(22) Filed: Mar. 25, 2021

(65) Prior Publication Data

US 2021/0351917 A1  Nov. 11, 2021
US 2022/0166606 A9  May 26, 2022

Related U.S. Application Data

(60) Provisional application No. 63/020,711, filed on May 6, 2020.

(51) Int. Cl.
*H04L 9/08* (2006.01)
*H04L 9/12* (2006.01)

(52) U.S. Cl.
CPC .......... *H04L 9/0819* (2013.01); *H04L 9/0852* (2013.01); *H04L 9/0891* (2013.01); *H04L 9/12* (2013.01)

(58) Field of Classification Search
CPC ... H04L 9/0819; H04L 9/0852; H04L 9/0891; H04L 9/12; H04L 9/0656
See application file for complete search history.

(56) References Cited

U.S. PATENT DOCUMENTS 7,809,143 B2 * 10/2010 Young ............... H04L 9/0852
                                                  380/278
10,187,205 B2 * 1/2019 Guinnard ........... H04L 9/0852
(Continued)

FOREIGN PATENT DOCUMENTS

EP    3185463 A1    6/2017

OTHER PUBLICATIONS

Charles H. Bennett and Gilles Brassard. "Quantum cryptography: Public key distribution and coin tossing". In: vol. 1. International Conference on Computers, Systems & Signal Processing. Bangalore, India, Dec. 1984, pp. 175-179.
(Continued)

*Primary Examiner* — Baotran N To
(74) *Attorney, Agent, or Firm* — CPST Intellectual Property Inc.; Brett J. Slaney

(57) ABSTRACT

A system and method are provided for mitigating key-exhaustion attacks in a key exchange protocol. The method includes computationally confirming an exchange of key bits has provided fresh shared key material before information theoretically confirming the exchange of key bits has provided fresh shared key material, while maintaining synchronization between messaging parties. In one implementation, maintaining synchronization includes updating keys in between each post-processing message session and managing a local state of each messaging party in the key exchange protocol prior to sending a next post-processing message. In another implementation, maintaining synchronization includes hiding a message containing the information theoretic authenticator by executing a decoy authentication process, prior to using an information theoretical key.

25 Claims, 9 Drawing Sheets

(56) References Cited

U.S. PATENT DOCUMENTS

| | | | | |
|---|---|---|---|---|
| 2001/0055389 | A1* | 12/2001 | Hughes | H04L 9/0858 380/44 |
| 2015/0271147 | A1* | 9/2015 | Tanizawa | H04L 9/0852 713/171 |
| 2016/0134420 | A1* | 5/2016 | Guinnard | H04L 9/0852 380/278 |
| 2020/0153619 | A1* | 5/2020 | Ribordy | H04L 9/0852 |

OTHER PUBLICATIONS

Johannes A. Buchmann, Erik Dahmen, and Andreas Hülsing. "XMSS—A Practical Forward Secure Signature Scheme Based on Minimal Security Assumptions". In: Post-Quantum Cryptography—4th International Workshop, PQ Crypto 2011, Taipei, Taiwan, Nov. 29-Dec. 2, 2011. Proceedings. Ed. by Bo-Yin Yang. vol. 7071. Lecture Notes in Computer Science. Springer, 2011, pp. 117-129.

Nikita Borisov, Ian Goldberg, and Eric Brewer. "Off-the-Record Communication, or, Why Not to Use PGP". In: Proceedings of the 2004 ACM Workshop on Privacy in the Electronic Society. WPES '04. Washington DC, USA: Association for Computing Machinery, 2004, pp. 77-84.

Artur K. Ekert. "Quantum cryptography based on Bell's theorem". In: Phys. Rev. Lett. 67 (Aug. 6, 1991), pp. 661-663.

Niels Ferguson, Bruce Schneier, and Tadayoshi Kohno. Cryptography Engineering—Design Principles and Practical Applications. Wiley, 2010; Chapter 7 (pp. 99-114); Chapter 14, section 4 (pp. 230-231) & Chapter 15, section 4 (pp. 252-255).

Ralph C. Merkle. "A Certified Digital Signature" In: Advances in Cryptology—CRYPTO '89 Proceedings. Ed. by Gilles Brassard. vol. 435. Lecture Notes in Computer Science. Springer, 1989, pp. 218-238.

Moxie Marlinspike. The Double Ratchet Algorithm. Ed. by Trevor Perrin. Version 1. Nov. 2016. URL: https://signal.org/docs/specifications/doubleratchet/.

Christopher Portmann. "Key Recycling in Authentication". In: IEEE Trans. Inf. Theory 60.7 (2014), pp. 4383-4396.

Kenneth G Paterson, Fred Piper, and Rüdiger Schack. "Quantum cryptography: a practical information security perspective". In: Nato Security Through Science Series D—Information and Communication Security 11 (2007), p. 175.

Alasdair B. Price, John G. Rarity, and Chris Erven. "A quantum key distribution protocol for rapid denial of service detection". In: EPJ Quantum Technology 7.8 (May 1, 2020).

Renato Renner and Stefan Wolf. "Unconditional Authenticity and Privacy from an Arbitrarily Weak Secret". In: Advances in Cryptology—CRYPTO 2003, 23rd Annual International Cryptology Conference, Santa Barbara, California, USA, Aug. 17- 21, 2003, Proceedings. Ed. by Dan Boneh. vol. 2729. Lecture Notes in Computer Science. Springer, 2003, pp. 78-95.

Renato Renner and Stefan Wolf. "The Exact Price for Unconditionally Secure Asymmetric Cryptography". In: Advances in Cryptology—EUROCRYPT. Ed. by Christian Cachin and Jan L. Camenisch. Berlin, Heidelberg: Springer, May 2004, pp. 109-125.

Douglas Stebila, Michele Mosca, and Norbert Lütkenhaus. "The Case for Quantum Key Distribution". In: Quantum Communication and Quantum Networking. Ed. by Alexander V. Sergienko, Saverio Pascazio, and Paolo Villoresi. vol. 36. Lecture Notes of the Institute for Computer Sciences, Social Informatics and Telecommunications Engineering. Springer, Oct. 2009, pp. 283-296.

Mark N. Wegman and Larry Carter. "New Hash Functions and Their Use in Authentication and Set Equality". In: Journal of Computer and System Sciences 22.3 (1981), pp. 265-279.

International Search Report issued in corresponding PCT Application No. PCT/CA2021/050389 dated Oct. 6, 2021; search completed Jun. 17, 2021.

* cited by examiner

SYSTEM AND METHOD FOR MITIGATING KEY-EXHAUSTION IN A KEY DISTRIBUTION PROTOCOL

CROSS-REFERENCE TO RELATED APPLICATION(S)

This application claims priority to U.S. Provisional Patent Application No. 63/020,711 filed on May 6, 2020, the contents of which are incorporated herein by reference.

TECHNICAL FIELD

The following relates generally to mitigating key-exhaustion in a key distribution protocol, for example in quantum key distribution.

BACKGROUND

All known quantum key distribution (QKD) protocols include at least three phases. The first phase describes the communication over the non-confidential and non-authenticated quantum channel, between two correspondents Alice and Bob. It is assumed that an adversary, Eve, has full control over this channel. That is, Eve can intercept, resend, alter, inject or block any message on the channel. Eve's only restriction is that she has to follow the laws of quantum mechanics. For example, the no-cloning-theorem applies so that she cannot clone qubits. Note that the above does not distinguish prepare-and-measure protocols (in which Alice sends qubits to Bob [BB84]) from entanglement-based protocols (in which Alice and Bob receive entangled qubits from an untrusted third party [Eke91]). After this first phase, both Alice and Bob have (classical) key bits in the form of qubit measurement outcomes, but they have no guarantee yet that they share this material with each other. For example, a man-in-the-middle could have been present.

The second phase of QKD describes the post-processing of the key bits from the first phase. The following description is based on [SML09]. The first step is called reconciliation, where Alice and Bob sift out the key bits resulting from measurements in incompatible bases. After some error correction on the result, Alice and Bob estimate the security parameter, which provides an upper bound on the information that Eve may have about the remaining shared key material. If there is enough secrecy left, Alice and Bob apply privacy amplification, i.e., they compress the key material to a shorter key on which Eve has negligible information. In the last step they confirm that they agree on a few key bits and use the rest for the last phase.

The last phase is referred to as key usage, for which the most commonly discussed case is encryption. When the key is used as a one-time pad, the encryption provides Information-Theoretical (IT) confidentiality, meaning that an adversary gets zero information about the plaintext from a given ciphertext. As discussed in the literature [PPS07; SML09] there are other use-cases which benefit from having an IT-secure (ITS) key. The details of key usage are considered out of scope in the following discussion, but instead one can assume that an IT-secure key is required as an output of the second phase.

An essential part of the second phase is the authentication of messages exchanged between Alice and Bob. Without this authentication Eve can impersonate either party and compromise the security of the resulting key material. In order to achieve IT authentication, Alice and Bob initially share some key material, which is why QKD is sometimes also referred to as quantum key expansion. Whenever a party authenticates a message, they consume some of their key material, just like encrypting with a one-time pad consumes the key. In the QKD literature this is not considered a problem since a successful completion of the second phase results in a large key, part of which can be reused for authenticating subsequent protocol executions, which can be considered replenishing the keys. What has not yet been considered is what happens when the second phase does not successfully complete and no new key material comes from the second phase, yet some key material has been consumed. An adversary can exploit this and successfully execute a key-exhaustion attack on any QKD protocol.

Message Authentication Codes

A message authentication code (MAC) asserts the authentication of a message by using a shared secret key. A MAC-tag can be attached to the message, which proves that the message originated from somebody that knows that secret key. Wegman-Carter MACs [WC81] are a method for generating an IT-secure message tag for a message. For any given message and security parameter $\lambda$ any adversary has a $2^{-\lambda}$ probability of guessing a correct tag for that message.

Any QKD protocol provides authentication of the classical messages sent in the second phase. In much of the QKD literature, the second phase is modelled to go over an authenticated channel. However, MACs are not the same as having an authenticated channel. For example, MACs do not protect against an adversary that replays messages, although such vulnerabilities can be addressed by using standard cryptographic principles such as tagging messages with sequence numbers. Another difference is that one now has a choice on when to authenticate. That is, the system can be designed to attach a MAC tag to every message or to send all messages unauthenticated, only to send a MAC tag computed over all messages at the end. It is found that this choice can impact the ease with which to execute a key-exhaustion attack.

Another subtle detail between simply having an authenticated channel and having IT-secure MACs is that the IT authentication key can only be used once. Although the authentication tag can be sent multiple times (possibly over redundant channels), the used key should not be used for any other purpose.

This property of IT authentication methods has been observed, e.g., the original BB84 paper states that: "key bits are gradually used up in the Wegman-Carter scheme, and cannot be reused without compromising the system's provable security; however [ . . . ] these key bits can be replaced by fresh random bits successfully transmitted through the quantum channel".

Related Work

Composing ITS authentication with QKD in this way has been proven secure by Portmann [Por14]. The protocols by Renner and Wolf [RW03, RW04] allow QKD post-processing from the assumption that Alice and Bob have correlated bitstrings, on which the adversary has limited knowledge. These are weaker assumption than those required for ITS MACS, where Alice and Bob share an identical bitstring on which the adversary has no knowledge. They achieve this by replacing authentication tags with the interactive protocol AUTH. However, that protocol also consumes the input bitstrings, both upon message acceptance and rejection, so that these protocols are similarly vulnerable to key exhaustion.

The BB84-AES protocol by Price, Rarity and Erven [PRE20] prevents a different attack on availability in BB84: they reduce the time until tampering with the qubit encoding bases is detected. In BB84-AES, the sender computationally encrypts and authenticates each basis and sends this in parallel with the encoded qubit itself.

The authors state that BB84-AES "inherently resists attempts to exhaust Alice and Bob's initial shared secret," but omit an important detail to assess the validity of the claim. In the final step of post-processing in BB84-AES "bits are taken from the final key and stored for use as the initial secret in the next round of QKD." The simplest interpretation is that the initial secret gets replaced, in which case the protocol is vulnerable to desynchronization. Even if Alice and Bob prevent desynchronization, it is unclear why synchronization is required at all. Since the protocol uses computational primitives, the simpler solution would be to use a static shared key from which a session key can be derived using standard cryptographic techniques.

SUMMARY

The following in part addresses what happens if transferring fresh random bits is unsuccessful. It is found that when unsuccessful, the protocol is opened up to a key-exhaustion attack in which an attacker manages to deplete legitimate users of all their IT key material.

The following system and methods address two main aspects. First, an attack on the availability of QKD protocols is described. This attack allows an adversary to completely exhaust the key material shared between two parties engaged in any QKD protocol. Attacks on availability are generally dismissed in the QKD literature. After all, no cryptography can protect a system from an adversary that simply cuts the wire. It is suggested that the impact of the described attack is more significant and undermines some of the security properties generally ascribed to QKD. Second, two mitigations are proposed that limits the likelihood of the described attack in practice. Arguments towards both the security and necessity of this mitigation are provided for any real-world deployment of a QKD protocol.

There are provided a method, computer readable medium and system for mitigating key-exhaustion attacks in a key exchange protocol, comprising or configured to computationally confirm an exchange of key bits has provided fresh shared key material before information theoretically confirming the exchange of key bits has provided fresh shared key material, while maintaining synchronization between messaging parties.

In an implementation, maintaining synchronization between the messaging parties includes updating keys in between each post-processing message session; and managing a local state of each messaging party in the key exchange protocol prior to sending a next post-processing message.

In an implementation, maintaining synchronization between the messaging parties includes hiding a message containing the information theoretic authenticator by executing a decoy authentication process, prior to using an information theoretical key.

In an implementation, maintaining synchronization between the messaging parties includes: (i) updating keys in between each post-processing message session and managing a local state of each messaging party in the key exchange protocol prior to sending a next post-processing message; and (ii) hiding a message containing the information theoretic authenticator by executing a decoy authentication process, prior to using an information theoretical key.

BRIEF DESCRIPTION OF THE DRAWINGS

Embodiments will now be described with reference to the appended drawings wherein.

DETAILED DESCRIPTION

Key Exhaustion

Figure 1:
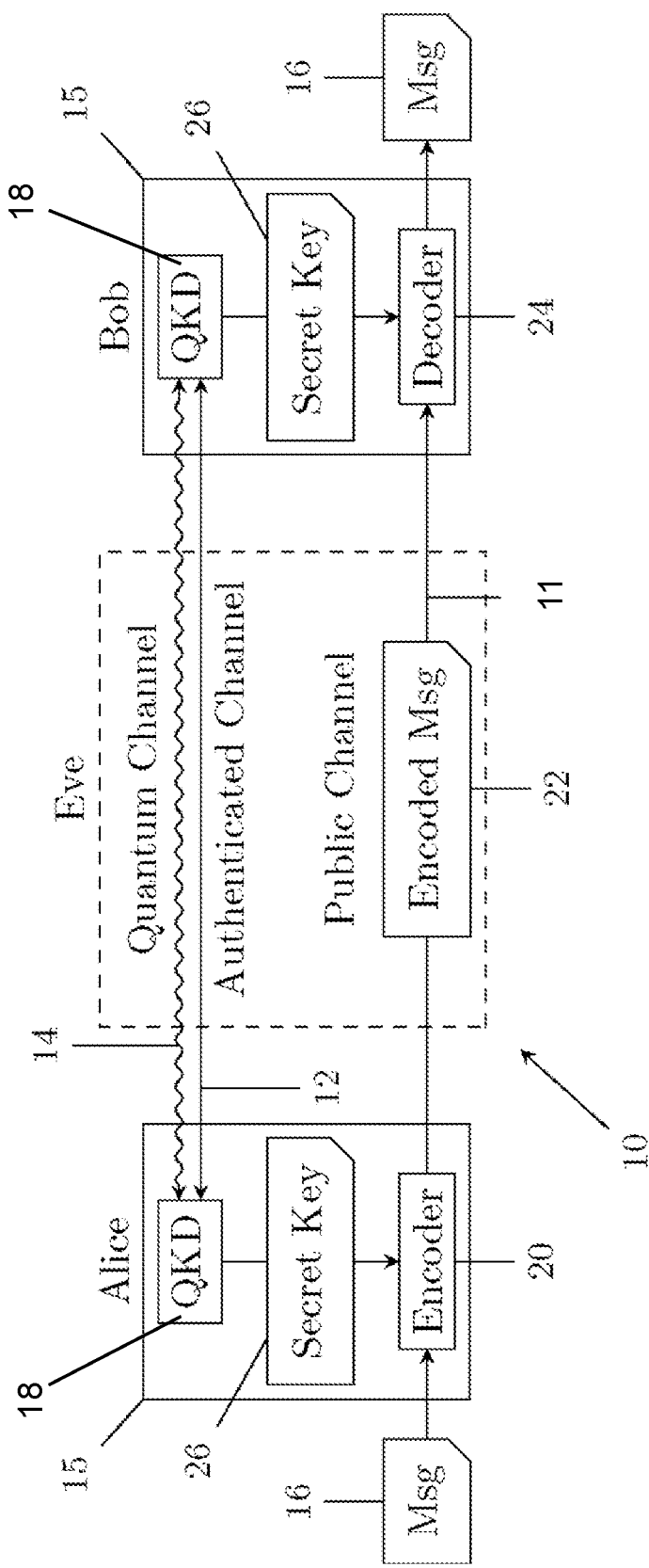
FIG. 1 is a schematic diagram of an example of a communication system utilizing a quantum channel.

It can be appreciated that while the following examples are provided in the context of QKD, the principles can also be applied to any shared digital resource that is used for authentication purposes, having a limited amount of that resource, and requires high assurance. For example, the principles herein can be applied to an end-to-end authentication in the QKD network layer.

The post-processing phase of any QKD protocol can have two possible outcomes: (i) either Alice and Bob conclude that they share enough secret key material to generate new keys, or (ii) they have to abort without generating any new key material.

If the initial quantum communication contained too much noise, either from the environment or from an eavesdropper, Alice and Bob typically cannot distill a shared secret key from the quantum measurement outcomes and have to abort. Another reason they might have to abort is that the verification of message authentication performed on the classical channel fails, indicating interference from a third party. Technically this could also be a consequence of environmental noise, but classical communication can be encoded with sufficient redundancy to make this occur with negligible probability only. In practice, any communications protocol will have to deal with message delivery failing. For purposes of the following, one can consider message delivery failure to be the same as message verification failure.

When a QKD protocol attempts to generate IT secure keys, the message authentication needs to be IT secure as well. This means that for every authentication tag Alice or Bob sends, they need to discard the key they used. An adversary may exploit this by forcing Alice and Bob to send tags even though it will not result in them generating fresh key material, thereby exhausting all available keys.

A few methods are available for the attacker to achieve key exhaustion, depending on how IT authentication is implemented. The following addresses two settings: one setting where every message is accompanied by the corresponding authentication tag; and another setting where every message is sent unauthenticated and only at the end do the parties send an authentication tag over all sent messages. Some protocol descriptions provide sufficient details to be able to tell which vulnerabilities apply, but it has been observed that most existing literature simply assumes an authenticated channel, thereby not providing the details to determine which setting applies.

When Alice and Bob attach a tag to every message, the attacker can achieve key exhaustion simply by sending sufficient noise on the quantum channel. The recipient of the noise authenticates their first post-processing message and discards their first stored key. If Alice and Bob have n keys for authentication, sending noise for at least n rounds will deplete the recipient of all those keys. Most QKD post-processing protocols do not abort until more messages have been sent back and forth, so that multiple keys will be wasted by a single attack. Since the number of messages until the first abort is constant for any specific protocol, the attack depletes n keys with O(n) effort.

The attack becomes slightly less trivial when Alice and Bob only authenticate at the end of phase two. Sending noise will not be sufficient since Alice and Bob abort if the non-authenticated messages indicate that there is insufficient fresh key material, this time before any key material has been used for authentication. Instead, the easiest way to perform the attack is to impersonate a legitimate party to the party that will send the first authentication tag. It is noted that the adversary cannot generate the correct reply at that point, but the damage is already done and the authentication key cannot be used again.

Practical Impact

The herein described key-exhaustion attack is an attack on availability, thus it can be classified as a Denial-of-Service attack. Theoretically, these attacks cannot be prevented by any cryptographic or security measure (if it is assumed that the attacker has full control over the channel, they can simply block all messages). However, in practice almost no adversary truly has full control of the channel. Within classical (computational) security systems some security measures can be taken to mitigate the impact of such attacks. The key idea in these mitigations is to increase the cost of the attack beyond the point where executing and/or maintaining the attack is worth the effort/cost.

When QKD uses IT authentication only, the key-exhaustion attack blocks all secure communications between two nodes indefinitely. Since the attack scales linearly with the number of keys stored by the legitimate parties, this attack is relatively cheap and provides a great payoff from the perspective of the adversary. Consider for example a satellite-based QKD network using only IT authentication per message—a malicious party can turn an expensive satellite into space-junk simply by shining a light on it.

In most security settings it is considered unacceptable to have no communications channel at all, so that a secure communications system will have to fall back to some lower level of security. This holds, in particular, against proposals to implement a hybrid of computational authentication and IT authentication. Proposals for such hybrid systems consider using public-key cryptography to authenticate the first session of QKD and to use the generated shared key material to authenticate subsequent rounds for IT security. One can dispute a strong statement made about such hybrid systems [SML09, Section 6.2]: If authentication is unbroken during the first round of QKD, even if it is only computationally secure, then subsequent rounds of QKD will be information-theoretically secure.

Instead, it is noted that key-exhaustion can reset Alice and Bob to the state they were in before executing the first round of QKD. An adversary that has broken the public-key authentication only after the first round can now use the key-exhaustion to reset the state and then compromise all future key material shared between Alice and Bob. The saving grace for QKD here is that forward secrecy is maintained, i.e., no old key material is compromised by the described attack. Combined with the fact that a successful key-exhaustion attack is trivial to detect by the legitimate parties at least means that Alice and Bob should be aware that they are compromised.

A possible objection to calling key-exhaustion a legitimate attack is that QKD in theory generates exponentially many key-bits in the number of key-bits consumed for authentication. One may thus point out that once sufficient key material has been generated the key-exhaustion attack becomes impractical for most adversaries. This can be rebutted in three ways.

Firstly, the attack is still linear in the stored key-length.

Secondly, such an asymptotic statement neglects the constants that are important for real-world systems. A common critique on contemporary QKD systems is their low key-rate and extracting many bits to protect against key exhaustion would be a very impractical solution for the near-term future.

Thirdly, the legitimate parties must maintain an exceptionally large state including secure updating and deletion of keys. This problem is exacerbated in network QKD solutions where the symmetric nature of IT authentication means that secure keys need to be stored for every pair of nodes in the network making this problem quadratically bigger.

Key-Exhaustion Against Computational Cryptosystems

The key-exhaustion attack does not apply exclusively to QKD and even extends beyond IT (secure) systems. Computational cryptography also has a limit on how often a key can be used until no more security can be guaranteed, assuming the underlying computational assumption is correct. This limit is often high enough that it makes a key-exhaustion attack impractical, and for most systems it could even be considered impossible for sufficiently large keys (here impossible means that an attacker needs to make a legitimate party user their key more often than there are resources available in the universe). More precisely, the cost for these attacks scales exponentially in the key-length, compared with linear scaling against IT secure systems. This makes the cost of a single signature or MAC tag so low that real-world cryptographic protocols simply abort incomplete sessions and try again when under active Denial-of-Service attack.

Computationally Authenticated Channel

Next, some implementation details of a computationally authenticated channel are discussed. The computational authentication itself can be achieved by either asymmetric cryptography (e.g., signatures) or by symmetric cryptography (e.g., MAC tags). The channel should not only protect against message forgeries, but also prevent other tampering such as replay, reflection and typing attacks.

Providing only message authentication on individual messages is found to be insufficient. The standard cryptographic engineering practice of setting up a secure channel with an ephemeral session key [FSK10] is not desirable as it requires another cryptographic primitive or protocol such as a key exchange, introducing more computational assumptions. In the worst case, such a solution might only provide computational protection against replay attacks, so that the overall integrity of the entire QKD session is diminished from ITS to computational security.

The following techniques are suitable for computational authentication, namely to include randomly generated nonces at the beginning of each session to ensure the session is fresh, number and/or tag individual messages to prevent out-of-order messages and typing attacks, and compute the message tags/signatures over the (partial) transcript. The computational authentication tags/signatures themselves should be omitted from the (partial) transcript, to ensure that existential unforgeability under chosen message attack (EUF-CMA) secure authentication suffices instead of requiring the stronger assumption of strong EUF-CMA (SUF-CMA) secure authentication. The nonces only protect against replays of reply messages: the initial message, despite containing a random nonce, could just be a replay of the initial message of an earlier session. Nonces can be omitted if the initial message and initial reply contain sufficient entropy to prevent replayed responses. However, if the nonces are included, then the ITS authentication tags should be computed over the full transcript including the nonces to ensure that the entire session was not replayed.

A monotonically increasing session identifier should be avoided to prevent replay attacks. This simple solution does prevent replay attacks, but it could lead to desynchronization by a computationally powerful adversary, because it adds the session identifier itself to the state that needs to be securely synchronized. Consider, for example, a solution with session identifiers (Alice and Bob locally store a copy: A.s and B.s). In this example, assuming Bob sends the first message in the protocol, Bob increments B.s by one on every new session, then sends B.s alongside his first message. Alice accepts Bob's message only if he sends a session value larger than her locally stored value A.s, and then updates A.s←B.s. Any value B.s>A.s+1 could be legitimate, because some of Bob+s initial messages in previous sessions may have dropped. Now, consider an adversary that is powerful enough to forge a computational tag, but requires a long time to compute it (at least longer than the message delivery timeout for the protocol). This adversary can compute a forgery of Bob's initial message, but with the initial s'>>A.s (for example, when s is restricted to a fixed-size integer, s' could be the maximum value). Consequently, Alice would overwrite A.s←s' and reject all Bob's legitimate future messages (which have B.s<s'). Although technically the keys are not exhausted, this desynchronization would have the same effect of blocking all future communication.

Aborts

One can consider four distinct causes for protocol aborts:
(i) post-processing fails: there was too much noise on the quantum channel;
(ii) time-out: the other party fails to reply in time;
(iii) crashes: for example due to a power outage; and
(iv) incorrect ITS tag.

If computational verification of an incoming message fails, including out-of-order or re-played messages, the protocol could either abort, or the message could be ignored. Either way, a computationally bounded adversary that tampers with or blocks messages will eventually trigger protocol abortion through a time-out. In case of cause (i) or (ii), the aborting party could optionally send a message indicating they aborted to allow quick initiation of the next session. Cause (iii) can happen at any time, which is why proper state management is so important.

In both mitigations described below, an abort by cause (iv) indicates the computational authentication was somehow broken. Even in the decoy-based (second) mitigation described below, where such a security failure does not immediately imply key exhaustion, this event should not have occurred and the system operator should be alerted to investigate and take the necessary security measures.

Parallelism

Alice and Bob should prevent parallel composition under the same ITS keys. Running multiple sessions concurrently runs into the problem of shared access to the secure state, which can lead to desynchronization in both mitigations. Preventing parallelism is not something that can be enforced by cryptography, but instead is guaranteed by the executing system.

QKD Example

FIG. 1 illustrates an example of a communication system 10 that includes a public (classical) channel 11, an authenticated channel 12, and a quantum channel 14. The channels 11, 12, 14 are used by a pair of correspondents, Alice and Bob to securely send a message 16 between them. Alice and Bob each have a cryptographic module 15, which corresponds to a device or module that includes processing and communication capabilities, including QKD functionality 18. In this example, Alice's cryptographic module 15 includes at least an encoder 20 to encode the message 16 and generate an encoded message 22 to be sent over the public channel 11, while Bob's cryptographic module 15 includes at least a decoder 24 to decode the encoded message 22 and obtain a copy of the original message 16. The quantum channel 14 and authenticated channel 12 are used to establish a secret key 26 used to decode the encoded message 22.

Figure 2:
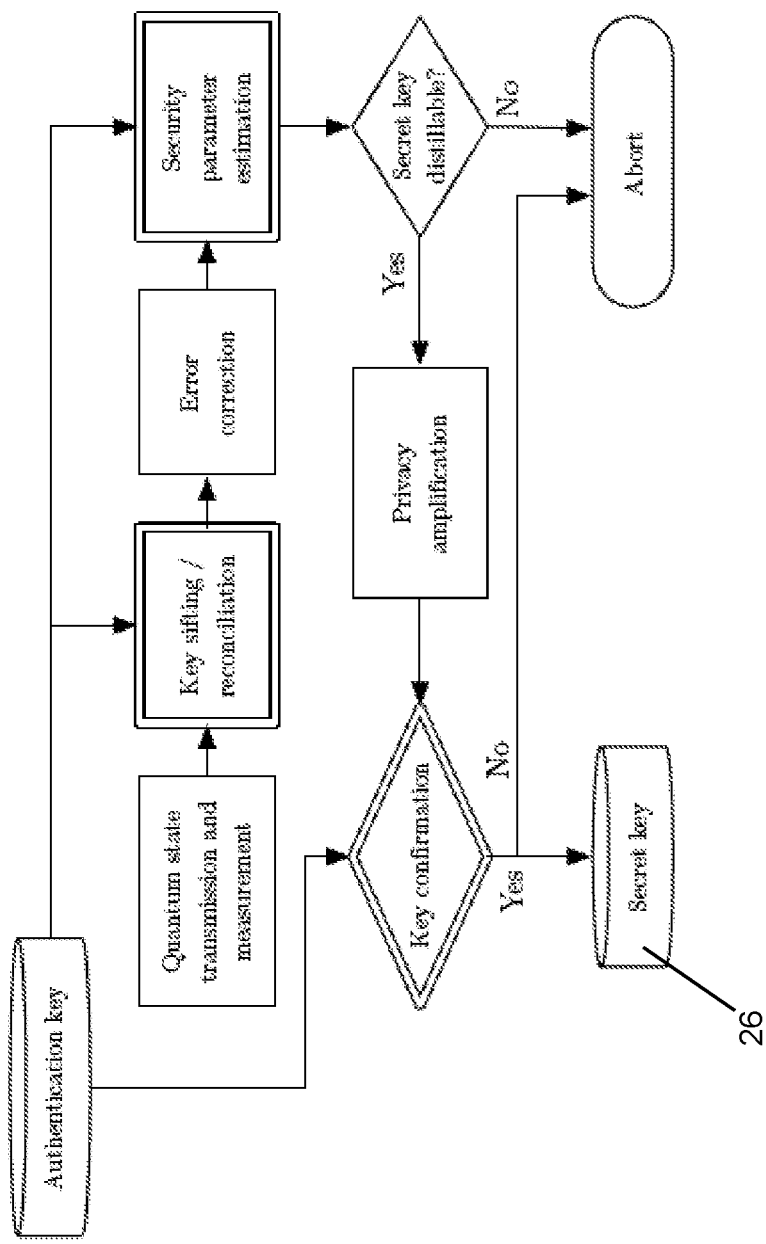
FIG. 2 is a flow chart illustrating stages of a QKD protocol.

FIG. 2 illustrates the stages of a quantum key distribution protocol that may be implemented using the quantum channel 14 and the classical channel 12. In QKD, two parties, Alice and Bob, obtain some quantum states and measure them. They communicate to determine which of their measurement results could lead to secret key bits; some are discarded in a process called sifting because the measurement settings were incompatible. They perform error correction and then estimate a security parameter which describes how much information an eaves dropper might have about their key data. If this amount is above a certain threshold, then they abort as they cannot guarantee any secrecy whatsoever. If it is below the threshold, then they can apply privacy amplification to squeeze out any remaining information the eaves dropper might have and arrive at a shared secret key 26. Some of this classical communication must be authenticated to avoid man-in-the-middle attacks. Some portions of the protocol can fail with negligible probability. Once a secret key 26 has been established by QKD, the secret key 26 can be used for a variety of purposes. The most common approach is to use it as the secret key 26 in a one-time pad to achieve unconditionally secure encryption. Part of the key 26 should be used for classical authentication in subsequent rounds of QKD.

First Practical Mitigation

Figure 3:
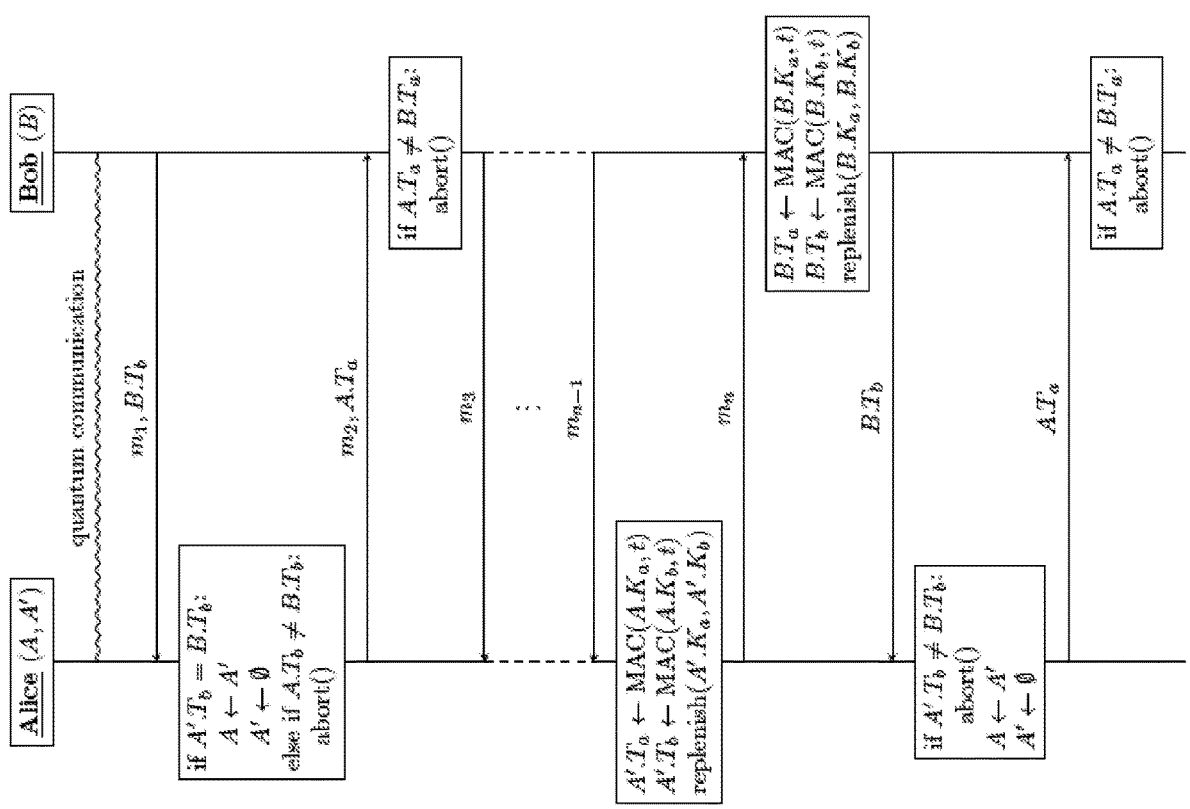
FIG. 3 is a sequence diagram illustrating a first mitigation against key-exhaustion.
Figure 4:
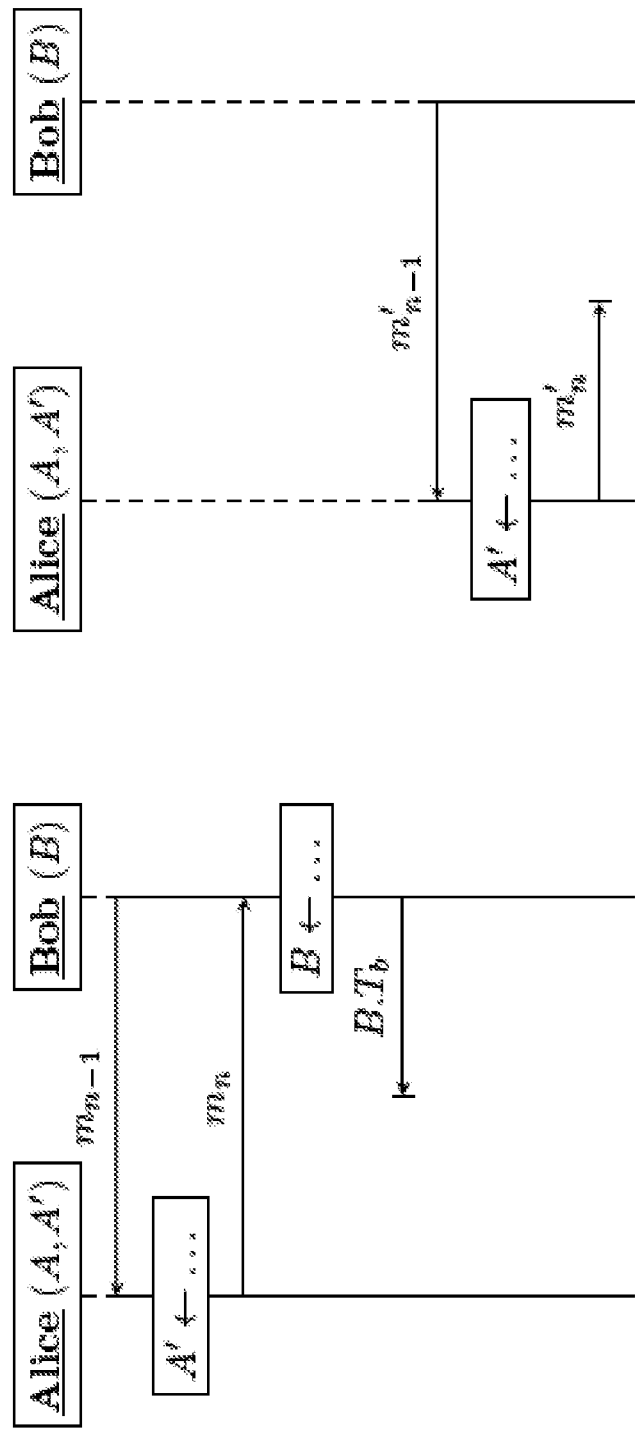
FIG. 4 is a sequence diagram illustrating a desynchronization of the first mitigation under parallel composition.

A first mitigation is provided in FIG. 3, which includes a sequence diagram of a ratchet-based QKD key exhaustion mitigation. As seen in FIG. 3, authentication of a QKD post-processing protocol ($m_1$, $m_1$, . . . , $m_n$) is performed using ITS MACs, classical messages are transmitted over a computationally authenticated channel, and ITS tags $T_b$ and $T_a$ are computed over the full transcript t=($m_1$, $B.T_b$, $m_2$, $A.T_a$, . . . , $m_n$). If the protocol uses nonces to prevent replay attacks, the transcript should include the nonces $N_a$ and $N_b$, so that t=($N_b$, $m_1$, $B.T_b$, $N_a$, $m_2$, $A.T_a$, . . . , $m_n$).

To prevent the first two key exhaustion attacks described above, the entire protocol is executed over a computationally authenticated channel as specified above. The mitigation updates the keys in between every session, somewhat reminiscent of the way modern secure messaging protocols like Off-the-Record (OTR) [BGB04] and Signal [Mox16] update their keys using a ratchet. In this mitigation, such a ratchet mechanism is combined with careful state management of the ITS values to prevent desynchronization by messages being dropped. This first mitigation only alters the method for authenticating the post-processing phase, leaving the message content of that phase and other phases unaltered, such that the mitigation applies to all QKD protocols. The remainder of this section describes the protocol in more detail.

All QKD protocols come with a classical protocol for post-processing. One can abstract away from its details: let $(m_1, m_2, \ldots m_n)$ be the sequence of n post-processing messages when neither party aborts. In general, it can be assumed that either party may abort after receiving any of these messages, for example if they detect the quantum communication contained too much noise. However, if the protocol accepts then it outputs shared secret key bits, denoted $k_q$, from which Alice and Bob can then take sufficiently many bits from that output to replenish two ITS authentication keys.

n is even so that Bob always sends his ITS tag first, and n≥4 which can be enforced by dummy messages if necessary. Bob initializes post-processing by sending $m_1$. The Alice/Bob roles are fixed in this and all future QKD sessions.

Alice holds the variables (A, A'):

$$A=(K_a,K_b,T_a,T_b)$$

$$A'=(K'_a,K'_b,T'_a,T'_b) \text{ or } \emptyset$$

A includes two authentication keys, her last sent tag and the last tag she received from Bob, while variable A' is either empty (denoted Ø) or holds unconfirmed replacement values for A. Bob only has the state variable B:

$$B=(K_a,K_b,T_a,T_b)$$

The idea of the protocol is that it maintains the invariant that A=B or A'=B.

First, consider message $m_{n-1}$: upon receiving it, Alice can complete post-processing and compute $m_n$. She takes the full protocol transcript:

$$t=(m_1,B.T_b,m_2,A.T_a,m_3,\ldots m_n)$$

over which she computes the ITS tags $$A'.T_a \leftarrow \text{MAC}(A.K_a,t)$$

$$A'.T_b \leftarrow \text{MAC}(A.K_b,t)$$

She also takes some bits from the shared QKD output $k_q$, preparing the next ITS authentication keys (A'.$K_a$, A'.$K_b$) for replenishing the current keys (A.$K_a$, A.$K_b$). Let $k_q'$ be the remaining key bits, which can be used in the next phase of key usage. She stores the values but does not overwrite any values in A, nor does she send any of the value in A': she just sends $m_n$. Upon receiving $m_n$ Bob also completes post-processing and computes the new values of B: he does overwrite the old values. Despite having updated his state he does not accept yet. He sends B.$T_b$ as ITS authentication of the session and to indicate he has updated his state. Alice accepts only if A'.$T_b$=B.$T_b$, at which point she overwrites her old state (A←A') and deletes the temporary state (A'←Ø). Finally, she sends her new tag (now stored in A.$T_a$), so that Bob can also accept when receiving A.$T_a$=B.$T_a$.

It is noted that one also attaches the ITS tags to the initial messages to ensure Alice and Bob can recover from any protocol abortion. If initially Alice holds on to an incomplete update (A'≠Ø), then either $m_n$ or B.$T_b$ has dropped in the previous session. Bob sends B.$T_b$ along $m_1$, which will tell her which one was dropped. If he sends A'.$T_b$ then he has received $m_n$ and she can complete the previous session by updating (A←A') and replying with the new A.$T_a$.

Otherwise, Bob sends the old A.$T_b$ which tells Alice that he has not updated his state, so either $m_n$ must have been dropped or Bob aborted. Either way she will reply with A.$T_a$ alongside $m_2$, confirming to Bob that A=B: they share the required ITS key material to continue the current session.

If Alice holds A'≠Ø and Bob sends A.$T_b$ alongside $m_1$, she concludes he has not received $m_n$ in the previous session, yet she is not to delete A'. This prevents key exhaustion by replay attacks. The computationally authenticated channel protects against replay attacks, as discussed above, however in the suggested implementation it does so by including nonces to ensure freshness of the session. This can only guarantee that replies are fresh, but Bob's initial message could be replayed. If Bob holds B.$T_b$=A'.$T_b$ while Eve replays a message (A.$T_b$, $m_1$), then deleting A' would desynchronize Alice and Bob.

Initialization

If QKD starts from the assumption that Alice and Bob already share sufficiently many random secret bits, they could initialize all values ($K_a$, $K_b$, $T_a$, $T_b$) with random shared bits. Sharing $T_a$ and $T_b$ this way has no cryptographic significance; its purpose is to simplify the implementation so that no separate instructions or messages are required in the first session.

Instead, if Alice and Bob start with each other's public key (verified, for example by a PKI), they can bootstrap by using public key signatures to set up the computationally authenticated channel [SML09], They initialize $T_a$ and $T_b$ to some default value to attach to and $m_2$ (this could simply be an empty string), all other messages remain the same. However, initially Alice and Bob do not compute ITS MACS over the transcripts. Instead, before sending $m_n$, Alice sets A' (including $T_a$' and $T_b$' directly with bits from $k_q$. Similarly, Bob sets B completely with bits from $k_q$. If the protocol aborts before Bob updated B, he resends the default tag alongside $m_1$ in the next session, signalling to Alice that they still need to bootstrap. Alice and Bob can also initialize a shared secret key for symmetric computational authentication of future sessions, which is more efficient than using public key signatures.

State Management

QKD post-processing requires maintaining a large state. In this section only the persistent state (A, A', B) used for ITS authentication is considered. One can call all other states the ephemeral state, which includes values such as qubit measurement outcomes. If the protocol aborts, then the ephemeral state can be discarded without leading to key-exhaustion or loss of security.

This first mitigation requires secure management of the local state by both Alice and Bob. The main problem is synchronization of volatile memory with persistent storage: the parties need to ensure that updates to their state are written to persistent storage before sending the next protocol message. Another problem is that of state cloning, for example due to virtual machine cloning or system backups, which can lead to key reuse and devastating loss of security.

The updates to the state should be atomic, minimizing the probability that a crash during the update leaves the persistent storage in a corrupted state from which Alice and Bob cannot recover. If we extend the adversary model to include active side-channels, additional countermeasures must be taken to prevent desynchronization through side-channels such as fault attacks during state updates.

A Balanced Variant

Figure 5:
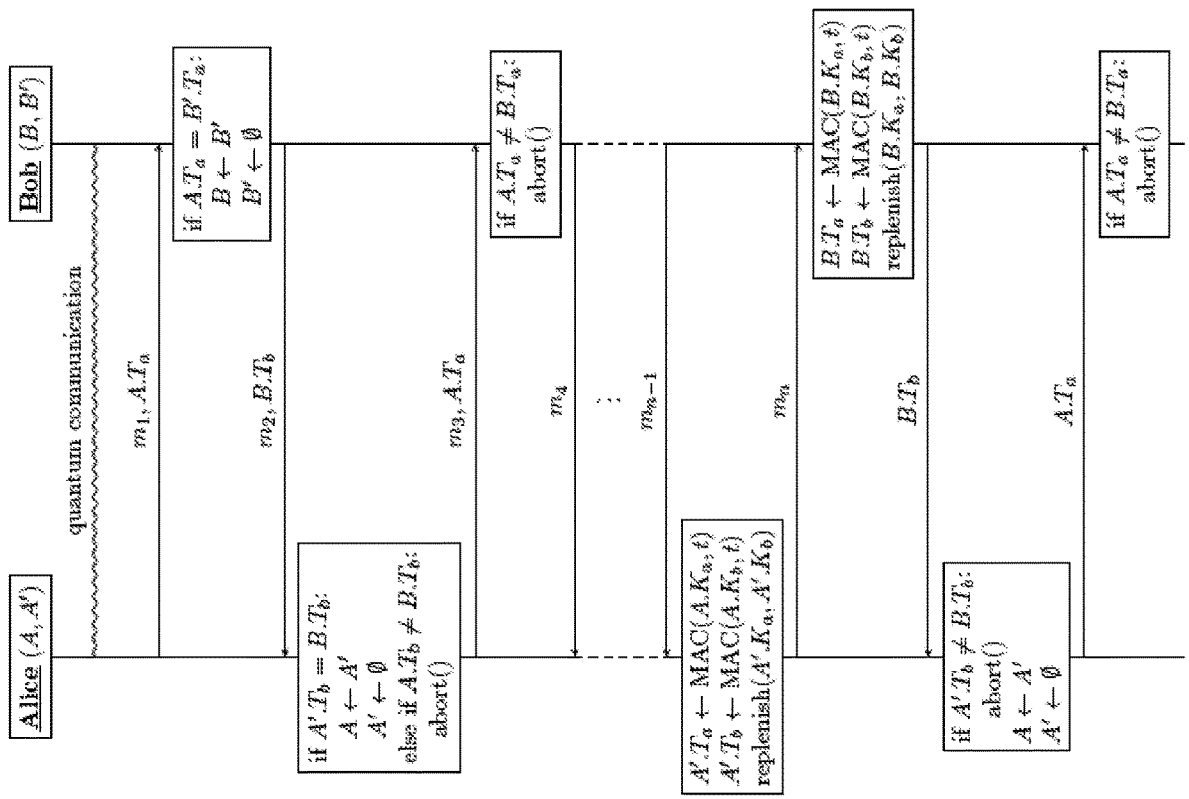
FIG. 5 is a sequence diagram showing a balanced variation of the first mitigation.

One can eliminate the requirement that Bob always has to initialize post-processing, by allowing either party to hold on to the unconfirmed updated value. This is depicted in FIG. 5. The balanced variant requires $n \geq 3$.

This variant maintains the invariant that A=B, A'=B or A=B', so that honest parties can always recover from aborted sessions. Values from A' and B' should never be sent, instead they are only used to locally update the state (A←A' or B←B') after the other party confirms they have updated their state. After message $m_2$ is processed, the protocol ensures that A=B, so the protocol also maintains an invariant that A'=∅ or B'=∅.

Assume Bob replies $B.T_b$ to message $m_n$, but his reply gets dropped and the parties abort, so that A'=B. If Alice initiates post-processing, she sends the old $A.T_a$. Bob cannot validate this value, but instead replies with $B.T_b$ to let Alice know she should update. After validating $A'.T_b = B.T_b$, Alice indeed overwrites A←A' and sends the new $A.T_a$ to confirm she has done so. Bob can validate this value. In general, Alice and Bob use the tags attached to messages $m_1$ and $m_2$ to properly update their state, while they use the tags attached to messages $m_2$ and $m_3$ to validate that they are still synchronized.

Second Practical Mitigation

Figure 6:
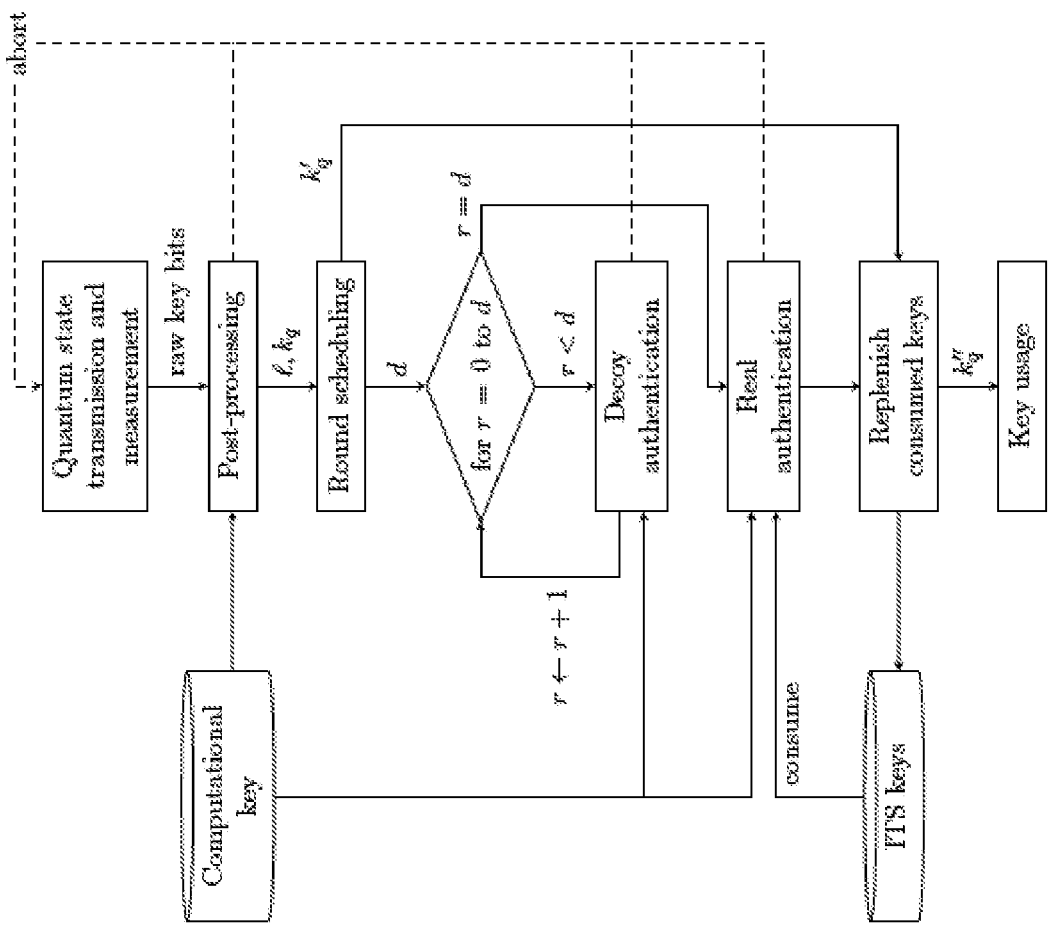
FIG. 6 is a flow chart illustrating a second mitigation against key-exhaustion.
Figure 7:
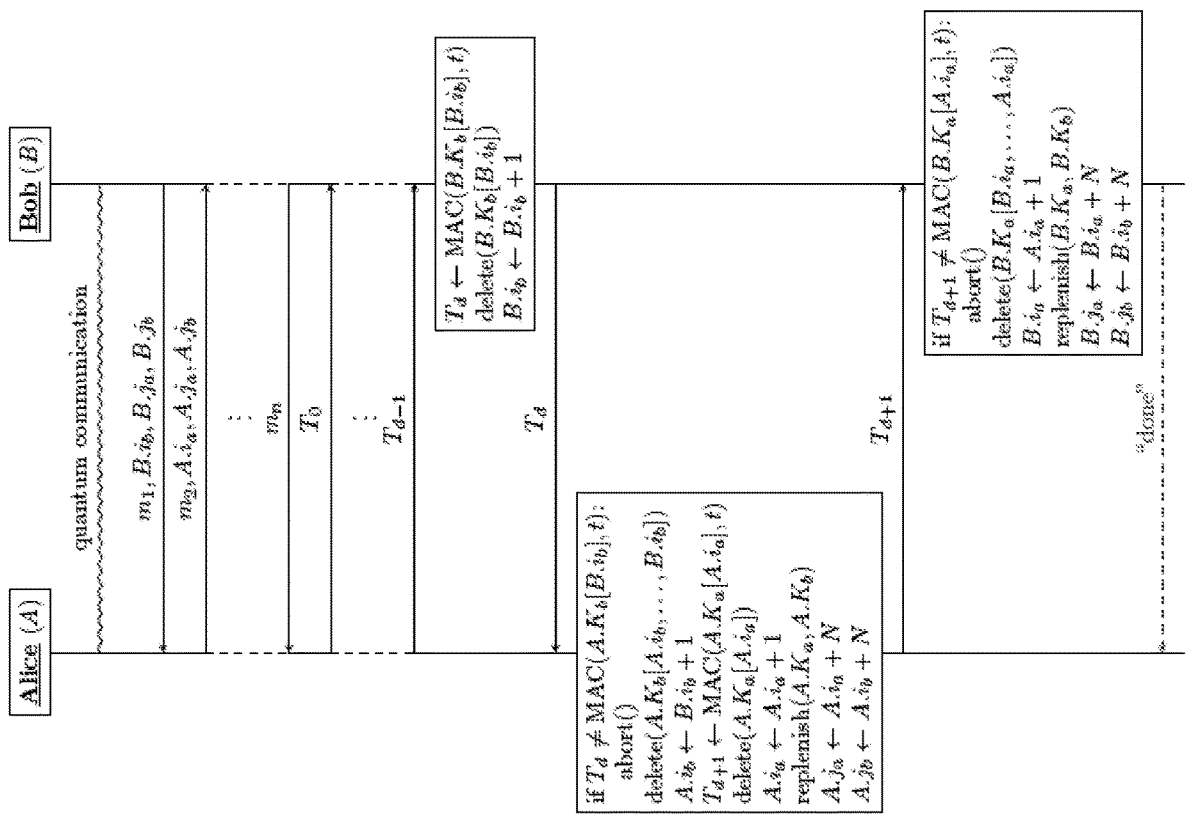
FIG. 7 is a sequence diagram of QKD with the second mitigation.

A high-level overview of a second mitigation is provided in FIGS. 6 and 7. Similar to the ratchet-based mitigation, phase one (quantum state transmission and measurement) and phase three (key usage) remains unaltered. All classical messages are sent over a computationally authenticated channel, as discussed above.

The main idea of this protocol is to obscure when the authentication is being done. This is achieved by probabilistically hiding the message containing the ITS authentication tag among multiple decoy messages. Whenever Alice and Bob detect any tampering with the decoy messages they can abort without having consumed an ITS key. Alice and Bob store multiple keys: the adversary can consume some keys by correctly guessing and blocking the real authentication message. However, by increasing the number of decoy rounds as more keys are lost, Alice and Bob make the probability that the adversary consumes all keys negligible.

Phase two can further be split in parts: the first part includes the regular QKD post-processing. This part is modified to include indices of ITS keys in the messages to prevent desynchronization. The second part includes the actual authentication: sending multiple decoy tags to hide the real ITS authentication tag, followed by the real authentication tag. The real tag ensures ITS authenticity of post-processing, as it is computed over the entire post-processing transcript. The key that was used to compute the real ITS tag must be securely discarded just before the tag is sent, to ensure it is never used again. Once both parties have received and verified the real tags, they have a guarantee that the fresh QKD key material is authentic and they can use it for replenishing consumed keys.

Unlike the ratchet-based protocol, either party can initialize post-processing, there is no lower bound requirement on the number of messages (n) and n can be even or odd.

Under normal circumstances, Alice and Bob share the key material ($K_A, K_B$), which are lists of multiple ITS authentication keys for use in both directions: Alice authenticates using $K_A$ and Bob uses $K_B[B.i_b]$. In the current session Alice will use $K_A[A.i_a]$ (the first unused key in her list) and Bob uses $K_B[B.i_b]$ All messages are delivered over a computationally authenticated channel, as specified above. If any step of the protocol fails, then the protocol aborts and all unauthenticated key material from phase one is discarded.

Alice and Bob compute l, a number indicating how many keys were lost, from the indices sent in the first messages and sample d, the number of decoy rounds, from the last l bits of the QKD output $k_q$, as described in detail below. A few of the fresh bits of $k_q$ will possibly be consumed by the decoy round scheduling, depending on how many keys are left: $k_q'$ denotes the bits that are not used for computing d. In rounds d and d+1 Alice and Bob will send real ITS authentication tags, while for rounds r with $0 \leq r < d$ they will send decoy tags.

Real tags are computed over the entire protocol transcript $$t = (m_1, B.i_b, B.j_a, B.j_b, m_2, A.i_a, A.j_a, A.j_b, m_3, \ldots m_n)$$

so that $$T_d \leftarrow MAC(B.K_b[B.i_b], t)$$

and $$T_{d+1} \leftarrow MAC(A.K_a[A.i_a], t),$$

assuming Bob sends the first real tag, otherwise Alice would send $T_d$ and Bob would send $T_{d+1}$. If the protocol uses nonces to prevent replay attacks, the transcript should include those nonces.

Decoy tags are generated such that they are indistinguishable from the real tags, to prevent the adversary from knowing which tag to block for successful key exhaustion. This is achieved by computing the decoy tag exactly like the real ITS tag but with a random key. For $0 \leq r < d$:

$$T_r \leftarrow MAC(K_r, t)$$

where $K_r$ is a locally generated random value.

After the real authentication passed successfully, both parties replenish any consumed keys in their ITS key storage using key bits from $k_q'$.

This means that $k_q$ is sufficiently large to guarantee that ITS key storage can always be fully replenished, before initiating the second part of providing ITS authentication of the transcript. Either the post-processing blocksize should be chosen sufficiently large, or multiple QKD iterations (including computationally authenticated post-processing) could be executed until the concatenation of all outputs is sufficiently large.

Of course, any message may be dropped by the adversary, with the result that $A.K_a \neq B.K_a$ and/or $A.K_b \neq B.K_b$. If message $T_d$ was dropped in a previous session, its sender has already consumed a key but the recipient does not know yet. Therefore, both Alice and Bob send their index i to indicate which sending shared key they have not consumed yet. On the other hand if message $T_{d+1}$ was dropped in a previous session, the sender has already replenished both $K_a$ and $K_b$, but the recipient was not yet able to do so. Therefore, both Alice and Bob send the indices $j_a$ and $j_b$ to indicate how many keys they were able to replenish already. If it turns out one party replenished more keys than the other, these indices tell them those keys are not shared and they should be overwritten by future replenishments. Although FIG. 7 shows that the indices are sent alongside $m_1$ and $m_2$, they could be sent alongside any post-processing message.

Finally, it is noted that the recipient of the final message ($T_{d+1}$) should always be the one to initiate the key usage phase, so that the act of initiating this phase does not reveal that message $T_d$ was real. Since not every context allows key usage to be initiated by either party and the honest parties do not know in advance if d is even or odd, we include an optional "done" message as the final message of phase two. This confirms message $T_{d+1}$ was delivered and verified successfully, signalling that the key usage phase can start. An adversary can trivially distinguish the "done" message from authentication messages and block it, but at that point both honest parties have already replenished all ITS keys and blocking the "done" message has the same effect as blocking the key usage phase itself. The "done" message must be computationally authenticated: otherwise an adversary could hold on to any message and reply with "done" to learn if the held message was message $T_{d+1}$ and only deliver it if it was not.

Round Scheduling

The round scheduling computes the number of decoy rounds using a few bits of the (fresh) key output from post-processing. The maximum number of decoy rounds equals the number of keys that were lost, for example because of previous key exhaustion attacks. This also means that when the protocol is not under attack and no keys have been lost, zero decoy rounds are required and no fresh key bits are consumed.

First Alice and Bob determine $\ell$: the number of lost keys, which can be derived from the indices sent in the first two messages. Let N be the size of key stores $K_a$ and $K_b$ when they are full, where N is a sufficiently large public parameter. Before every session Alice and Bob hold the states A and B respectively, with:

$$A.K_a = [K_a[A.i_a], \ldots K_a[A.j_a-1]]$$

$$A.K_b = [K_b[A.i_b], \ldots K_a[A.j_a-1]]$$

$$B.K_a = [K_a[B.i_a], \ldots K_a[B.j_a-1]]$$

$$B.K_b = [K_b[B.i_b], \ldots K_b[B.j_b-1]]$$

where the indices themselves are also stored in the state. Initially $A.i_a = B.i_a = A.i_b = B.i_b = 0$ and $A.j_a = B.j_a = A.j_b = B.j_b = N$.

Alice and Bob compute $j_a = \min(A.j_a, B.j_a a)$ and $j_b = \min(A.j_b, B.j_b)$, so they know the agree on the shared subset $A.K_a \cap B.K_a = [K_a[A.i_a], \ldots K_a[j_a-1]]$ and $A.K_b \cap B.K_b = [K_b[B.i_b], \ldots K_b[j_b]]$. Thus $$l_a = N - |A.K_a \cap B.K_a| = N - j_a + A.i_a$$

and $$l_b = N - |A.K_b \cap B.K_b| = N - j_b + B.i_b,$$

and one can simply set $$l = \max(l_a, l_b).$$

If either $l_a = N$ or $l_b = N$, then Alice and Bob cannot complete the ITS authentication and the keys have been exhausted. Otherwise, Alice and Bob should replenish $l_a + l_b + 2$ keys at the end of the current session: the keys already lost plus the two keys for authentication of the current session.

Given the B-bit QKD output $k_q \in \{0,1\}^B$, Alice and Bob sample d, the number of decoy rounds, from the last l bits of $k_q$ as:

$$d = l - \min(\{\varkappa | k_q[B-\varkappa-1]=1\} \cup \{l\})$$

where the array notation $k_q[\varkappa]$ means the $\varkappa$-th bit of $k_q$. This can be computed by scanning the last l bits of $k_q$ to find the last bit with value one. Sampling d in this way accomplishes that the number of decoy rounds is likely to be close to l.

The protocol leaks d since it is complete, after having received and verified the last real message, but importantly this value should not leak before the end of the session. This leaks the last l−d+1 bits (or l bits when d=0), since those have been 10 . . . 00 (or all zeroes), so these suffix bits must be discarded. The remaining bits are $k_q'$ a prefix substring of $k_q$:

$$k_q' = k_q[0, \ldots B-1-\min(l,l-d+1)]$$

The bits of $k_q'$ do not need to be inspected by the scanning computation, therefore these bits do not leak and can be used for replenishing lost keys and for key usage.

It is important that such round scheduling is biased to schedule many decoy rounds. Any distribution where d≤1 always has a non-negligible probability can be exhausted with polynomially many attacks by an adversary that always blocks $T_1$.

Initialization

Initialization is straightforward: if Alice and Bob are assumed to share sufficiently many key bits, they can set $K_a$ and $K_b$ directly from these shared bits and set all indices to i=0 and j=N. When bootstrapping from public key cryptography, they can indicate this by omitting or using some default values for the indices in the first messages and omitting the ITS tags altogether from the bootstrapping session.

State Management

The same considerations regarding state management apply as those discussed above regarding the first, ratchet-based mitigation. There are however two factors that complicate secure state management somewhat for the decoy-based mitigation.

The state is larger: assuming, for example, 128-bit keys, N=171 and 128-bit indices i and j, then both parties must securely manage a state of 2800 bytes.

State updates could leak d through side channels to an eavesdropper.

Alternative Implementation

Figure 8:
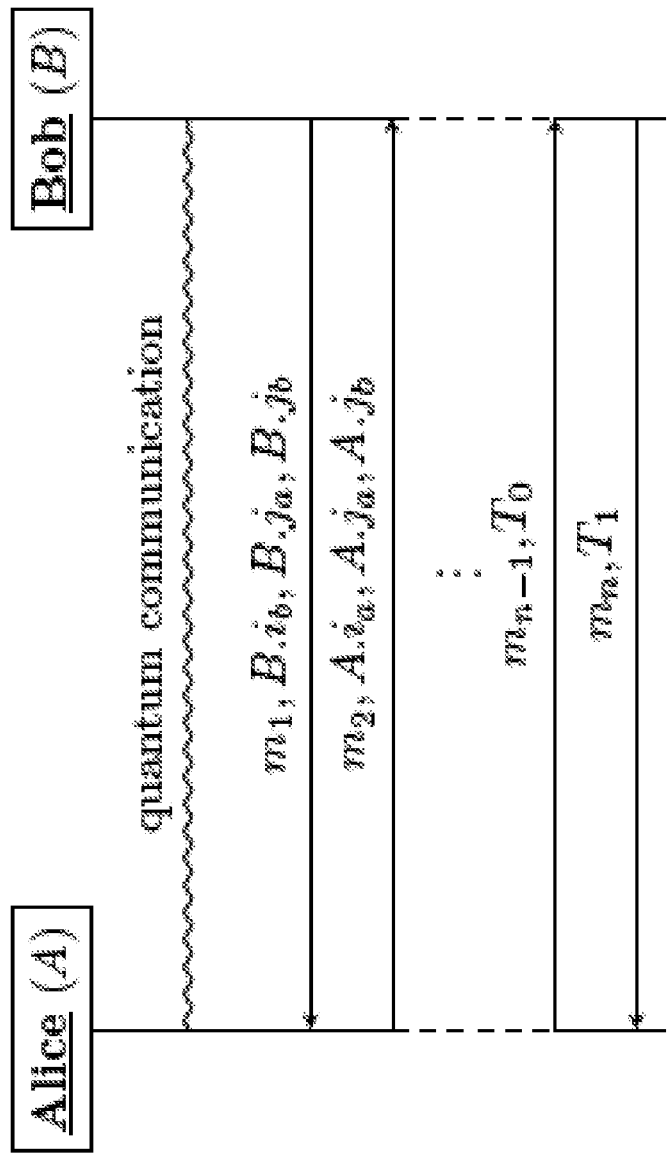
FIG. 8 is a sequence diagram of the second mitigation in an alternative implementation.

An alternative is possible with the decoy-based mitigation when l≤1. Instead of sending the ITS tags after the last post-processing message, they can be attached to the last messages, as show in FIG. 8. $T_1$ is computed over the full transcript, while $T_0$ is computed over the partial transcript that omits $m_n$. State updates remain the same as in the default decoy-based mitigation. This alternative is not possible for the ratchet-based mitigation, where the ITS tags can only be sent after there is computational confirmation that the entire session was completed successfully.

Since the sender of $T_0$ computes their ITS tag over all of their own messages in the transcript, this provides ITS authentication of the entire QKD session to the recipient. The honest parties might abort upon receiving $m_{n-1}$ or $m_n$ because post-processing failed, however this does not make the protocol more vulnerable to key exhaustion However, when l>1, the ITS tags should be sent after $m_n$. For specific QKD protocols, such an improvement could also apply when l>1. For example, if the sender of $m_n$ knows that it will never trigger a post-processing abort (for example in [BB84], $m_n$ is just a message confirming that some revealed key bits were correct) then $T_0$ can always be attached to $m_n$, reducing the total number of messages by one in every session.

Mitigation Comparison

Either mitigation prevents key exhaustion, but they differ in some details as discussed in the sections above. Which mitigation is preferable depends on the context, for example to which specific QKD protocol it is applied or whether a small state or fewer messages are preferred. In this section we also consider a mitigation that combine both.

The first, ratchet-based mitigation requires fixed roles for Alice and Bob, so it could be more applicable to prepare-and-measure QKD protocols that fix the roles anyway. It has the advantage of requiring a smaller state and it is less susceptible to passive side channel attacks. Either party can initiate the key usage phase after successful ITS authentication, so that the "done" message of the decoy-based mitigation is never required.

The second, decoy-based mitigation can be initiated by either party, so it could be more applicable to symmetric QKD protocol, such as entanglement based ones. It has no requirement on the number of post-processing messages, so it never needs dummy messages to make n≤4 or to make n even. When not under attack and when the alternative is implemented, this mitigation requires no additional messages.

Combining the Mitigations

Figure 9:
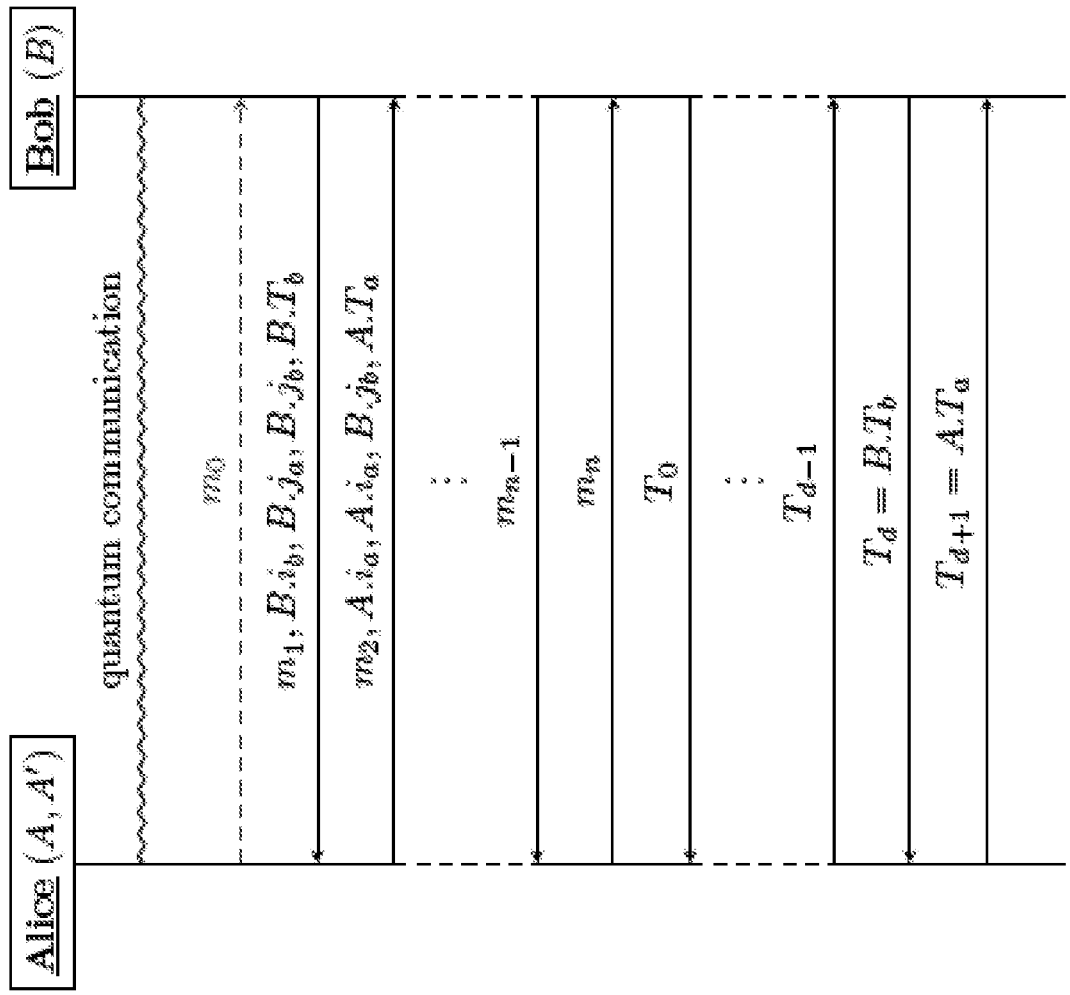
FIG. 9 is a sequence diagram of combined mitigations.

The decoy-based mitigation requires fewer overhead in many contexts, especially while the system is not under attack. However, the ratchet-based mitigation can turn out to be cheaper when the system is under attack, this suggests a method of combining them, where Alice and Bob always run the decoy-based mitigation but fall back to the ratchet-based mitigation just before the last key would be consumed. This is depicted in FIG. 9.

Alice holds $A=(i_a, j_a, i_b, j_b, K_a, K_b, T_a, T_b)$, where $K_a$ and $K_b$ contain up to N its keys (as in the decoy-based mitigation), but she also holds A', while Bob only holds B (as in the ratchet-based mitigation). Alice and Bob run the decoy-based mitigation, possibly including the alternative discussed above. However when l-N-1 and only one key is left, Alice prepares A' just before sending $T_{d-1}$: she computes the tags over the current transcript (A'. $T_a \leftarrow$ MAC (A.$K_a$[A.$i_a$],t) and A'.$T_b \leftarrow$ MAC(A.$K_b$[B. $i_b$],t)), replenishes A'.$K_a$ and A'.$K_b$ and accordingly updates the indices in A'. She sends $T_{d-1}$, so Bob can overwrite B and then send $T_b$=B.$T_b$ to indicate he has update his state. Upon receipt, Alice can overwrite A←A'.

If any messages before $T_d$ is dropped, no keys are consumed and Alice and Bob can try again in the next session. If $T_a$ is dropped, then A'=B, so Alice can update her state upon receiving B.$T_b$ alongside $m_1$ in the next session. If $T_{d+1}$ is dropped, then A=B and the keys have already been replenished, which Bob will learn upon receiving A.$T_a$ alongside $m_2$ in the next session. Once Alice holds A'≠Ø, Bob must B.$T_b$ before she sends A.$T_a$ in the next session. If Alice initiates post-processing, she can send a dummy $m_0$ message to request $m_1$ from Bob ($m_1$ itself could also be a dummy message, but Bob's message must contain B.$T_b$). The role of Alice and Bob is fixed by the parity of d in the session where the last key was used, so if necessary the round scheduling of that session could be adjusted to fix the parity and thereby the roles.

The security of the combined mitigation follows directly from that of the ratchet-based one: key exhaustion will only occur when the last key is consumed, and the last key is protected by the ratchet-based mitigation. Therefore N can be chosen very small, so that the state that needs to be securely managed is only slightly larger than that of the ratchet-based mitigation.

The idea could also be combined with the balanced variant discussed above, in which case the dummy message $m_0$ is not required.

Discussion

All QKD protocols that establish ITS key material require some post-processing protocol over an ITS authenticated channel. All known ITS authentication methods consume (some of) their key material upon use, which can be exploited by an adversary to exhaust all key material. The above classifies three ways for an adversary to do so: noise on the quantum channel, tampering with the classical channel and desynchronization. It is generally accepted that all known QKD protocols and implementations are vulnerable to one or more key exhaustion attacks.

Two mitigations are provided above that only use ITS authentication after the post-processing session has been authenticated computationally, avoiding the first two classes of key exhaustion. The first mitigation updates the state in stages before accepting the session to prevent desynchronization, even if the protocol has to abort at any point. The second mitigation hides when the state is updated to prevent desynchronization. Both mitigations require secure management of only a small state, preventing other attacks on availability based on device resource exhaustion.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the cryptographic module 15, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of mitigating key-exhaustion attacks in a key exchange protocol, the method comprising:
   computationally confirming an exchange of key bits has provided fresh shared key material before information theoretically confirming the exchange of key bits has provided fresh shared key material, while maintaining synchronization between messaging parties.

2. The method of claim 1, wherein maintaining synchronization between the messaging parties comprises:
   updating keys in between each post-processing message session; and
   managing a local state of each messaging party in the key exchange protocol prior to sending a next post-processing message.

3. The method of claim 2, further comprising attaching an information theoretically secure (ITS) tag to a first post-processing message sent by each party.

4. The method of claim 3, further comprising sending an ITS tag after a last post-processing message.

5. The method of claim 2, wherein the post-processing comprises n messages, wherein n is dictated by a quantum key distribution (QKD) protocol to which the method is applied.

6. The method of claim 2, wherein either party can abort after receiving any of the post-processing messages.

7. The method of claim 2, wherein a first party comprises a pair of state variables (A, A') and a second party comprises a state variable (B).

8. The method of claim 7, wherein the method maintains an invariant that A=B or A'=B.

9. The method of claim 7, wherein the second party initiates the exchange of post-processing messages.

10. The method of claim 2, wherein either party can hold on to unconfirmed updated values, with a number of post-processing messages exchanged being 3.

11. The method of claim 10, wherein a first party comprises a pair of state variables (A, A') and a second party comprises a pair of state variables (B, B').

12. The method of claim 11, wherein the method maintains an invariant that A=B, A'=B, or A=B'.

13. The method of claim 12, wherein values from A' and B' are only used to locally update the state after the other party confirms they have updated their state.

14. The method of claim 7, wherein the value from A' is only used to locally update the state after the other party confirms they have updated their state.

15. The method of claim 1, wherein maintaining synchronization between the messaging parties comprises:
   hiding a message containing the information theoretic authenticator by executing a decoy authentication process, prior to using an information theoretical key.

16. The method of claim 15, wherein the authenticator comprises an information theoretically secure (ITS) authentication tag, and the message containing the ITS authentication tag is hidden among zero or more decoy messages.

17. The method of claim 16, further comprising sending a real ITS authentication tag following zero or more decoy tags.

18. The method of claim 15, further comprising:
   verifying real information theoretic authenticators exchanged by parties of the key exchange protocol.

19. The method of claim 15, further comprising computing a number of decoy rounds using one or more bits of key output from post-processing.

20. The method of claim 19, wherein a maximum number of decoy rounds scheduled is at least equal to a number of keys that were lost.

21. The method of claim 1, further comprising using a first portion of output key material to replenish authentication keys.

22. The method of claim 21, further comprising using a second portion of the output key material in a subsequent cryptographic operation.

23. The method of claim 1, wherein maintaining synchronization between the messaging parties includes:
   (i) updating keys in between each post-processing message session and managing a local state of each messaging party in the key exchange protocol prior to sending a next post-processing message; and
   (ii) hiding a message containing the information theoretic authenticator by executing a decoy authentication process, prior to using an information theoretical key.

24. A non-transitory computer readable medium comprising computer executable instructions for mitigating key-exhaustion attacks in a key exchange protocol, comprising instructions for:
   computationally confirming an exchange of key bits has provided fresh shared key material before information theoretically confirming the exchange of key bits has provided fresh shared key material, while maintaining synchronization between messaging parties.

25. A system of mitigating key-exhaustion attacks in a key exchange protocol, system comprising a process and memory, the memory storing computer executable instructions that when executed by the processor cause the system to:
   computationally confirm an exchange of key bits has provided fresh shared key material before information theoretically confirming the exchange of key bits has provided fresh shared key material, while maintaining synchronization between messaging parties.

* * * * *